United States Patent Office 2,932,590
Patented Apr. 12, 1960

2,932,590

INDIUM OXIDE COATINGS

Robert E. Barrett, Earl R. Olson, and Paul Schall, Jr., Columbus, Ohio, assignors, by mesne assignments, to The Battelle Development Corporation, Columbus, Ohio, a corporation of Delaware No Drawing. Application May 31, 1956
Serial No. 588,259

9 Claims. (Cl. 117—201)

This invention relates to transparent electrically conductive coatings, articles coated therewith, and methods of preparing the coatings and coated articles. More particularly, this invention relates to thin, light transmissive, electrically conductive coatings substantially of an indium oxide, transparent articles coated therewith, and methods of preparing said coatings and coated articles at application temperatures as low as about 200° F.

A number of coatings that are relatively transparent and electrically conductive are available for transparent articles. The uses of articles having these coatings for preventing fogging and ice formation on aircraft canopy components, for defrosting of automobile windshields and windows, for heating by radiant heating panels, for control of electroluminescent screen electrode panels, and for other uses are well known.

Some known methods of preparation of thin, transparent electrically conductive coatings on articles are thermal evaporation, sputtering, and iridizing or chemical deposition. However, as far as is known, these methods require the use of temperatures higher than about 400° F. Limitations are thereby imposed on the particular article to be coated because of the use of high temperatures in the preparation of the coated article. Where the article to be coated is adversely affected by high temperatures of between 200° F. to 1000° F., present-day methods are unable to prepare a satisfactory transparent electrically conductive coating. Some articles that are known to be adversely affected by high temperatures of between 200° F. to 1000° F. are laminated safety glass, tempered glass, high-quality optical glass, and plastics. In addition, many of the known methods of application of thin, transparent electrically conductive coatings do not give coatings with adequate optical properties for many applications.

For example, in the prior art, to obtain a transparent electrically conductive coating a method is the thermal oxidation of a deposited metal coating. However, the known prior art was concerned with high temperatures, of the order of 1000° F. or higher, for deposition and oxidation of the metal coating. Metal coatings deposited under high temperature conditions have properties which approach the bulk metal properties. Normally, these metal coatings were prepared with low-residual pressures in a vacuum system at high deposition rates. The resistivity of the meal coatings was low; the films possess metallic luster and were about as resistant to oxidation as the bulk metal and therefore required relatively high oxidation temperatures.

Where the term, "substrate," is used in the specification and in the claims it is to be understood a substrate is a base for an article, having a transparent electrically conductive coating, and it is to be understood that substrate is inclusive of silicate substrates containing silica such as mica, aluminum silicate, and calcium silicate; various types of glasses containing silica such as lead glass, optical glass, lime glass, and borosilicate glass; fabricated articles containing silica, such as laminated safety glass; and other materials, such as plastics and nonmetals. Where the phrase, "adversely affected by high temperature," is used to describe a substrate or an article in the specification and the claims, it is to be understood as inclusive of the articles and substrates whereof a temperature between 200 to 1000° F. causes a detrimental, deleterious, or destructive effect to the same.

An object of the invention is to provide thin, light transmissive, electrically conductive coatings and methods of preparation of the same without subjecting the substrates coated thereby to temperatures high enough to cause deleterious or adverse effects to the articles or substrates.

Other objects of the invention are methods for the preparation of a coated article comprising a substrate coated with a thin, light transmissive, electrically conductive coating, substantially of an indium oxide.

Another object of this invention is a coated article comprising a substrate of a transparent material, said substrate being adversely affected by high temperatures of between 200 to 1000° F., and a coating, substantially of an indium oxide, possessing a high light transmittance and a low electrical resistance.

Still another object is a thin, light transmissive, electrically conductive coating, substantially of an indium oxide, for a substrate or article, adversely affected by high temperatures.

Still other objects of this invention are methods for preparation of a coating, substantially of an indium oxide, possessing a high light transmittance and a low electrical resistance which comprise the deposition of indium and the thermal oxidation of said indium to an indium oxide.

Further objects and advantages of this invention will be readily seen and appreciated as the same become better known and understood by reference to the following detailed description when considered in conjunction with the specific examples.

In outward appearance the article of the invention may not be detachable from an uncoated substrate. Possibly this is so, because the coatings of the invention are relatively thin compared to the substrate and are highly light transmissive. It is only upon chemical analysis, or electrical measurement, or optical measurement, or examination under magnification, or other means of chemical or physical examination and testing that the coatings of the invention may be detected.

An article of the invention comprises a substrate to which a transparent coating has been applied. In other embodiments included within the scope of the invention, the article comprises: a substrate to which a suitable undercoating has been applied with a coating of the invention on top of the undercoating; or a substrate to which a coating of the invention and a suitable overcoating on top of the coating of the invention has been applied; or a substrate to which a suitable undercoating with a coating of the invention on top of the undercoating, and with suitable overcoating on top of the coating of the invention, has been applied. Suitable undercoatings and overcoatings for purposes such as improved adhesion, decreased light reflectance, and other purposes are well known to the art.

The methods of practicing the invention comprise the controlled deposition of a thin coating, substantially of indium, and the oxidation of said coating by thermal oxidation at temperatures as low as about 200° F. to obtain thin, light transmissive, electrically conductive coatings, substantially of an indium oxide. A coating of the invention comprises a thin coating, substantially of an indium oxide, prepared by the methods of the invention. The thin coatings, substantially of an indium oxide, of the invention may vary from several up to about 10,000 angstroms or higher in thickness. The article of the invention is inclusive of an article comprising a substrate, adversely affected by high temperatures of between 200 to 1000° F., having a thin, light transmissive, electrically conductive coating, substantially of an indium oxide.

In the specification and the claims, the electrical resistance has been expressed in terms of ohms per unit square, a convenient method of expressing the resistance of thin coatings, and it is to be understood that this term is the specific electrical resistivity of the coating divided by the average coating thickness within the area of the square. These electrical resistances are as usual, the reciprocals of the electrical conductivity and accordingly the lower the electrical resistance the better the electrical conductivity.

The present invention utilizes controlled deposition conditions that results in deposition of an indium metal coating which differs significantly from the bulk metal in structure and/or composition in that the coating can be readily oxidized at lower temperatures than were possible in the prior art. The methods of the invention produce coatings, substantially of an indium oxide, that have a high light transmission, a low electrical resistance, satisfactory stability of the electrical resistance, and adequate adherence to the substrate.

The deposition rate as used in the specification and the claims is defined as being obtained by dividing the thickness of the oxide coating by the time required to deposit the metal coating. The proportionality constant of the deposition rate to the true evaporation rate is dependent on the thickness change accompanying oxidation. In the case of thermal evaporation, the deposition rate is approximately proportional to the true evaporation rate.

In the practice of this invention, thin, transparent, electrically conductive coatings, substantially of an indium oxide, may be produced by thermal oxidation of deposited indium coatings at temperatures as low as about 200° F., providing the following deposition condition limits are used: the deposition rate should be less than 100-angstroms thickness per minute; for deposition by thermal evaporation there should be a residual air pressure during deposition of from 0.1 to 50 microns of mercury; and the substrate temperature should be less than 250° F. Preferably the temperature of the substrate during deposition of a coating, substantially of indium, should be maintained at less than about 200° F.

Some selection of deposition conditions within the aforementioned limits is possible depending upon the specific properties desired in the article, such as electrical resistance, electrical resistance stability, light transmission, film adherence, and the maximum oxidation temperature permitted by the particular substrate. Some properties of the article can be improved, generally at the expense of other properties by adjustment of conditions within the limits, and the various permissible conditions will differ somewhat for specific articles. Therefore, knowing the particular substrate and the desired properties for an article, one is best able to select suitable deposition conditions.

Suitable vacuum deposition apparatus known to the art may be utilized for deposition of coatings, substantially of indium, by the methods of the invention.

In the practice of this invention to obtain coatings substantially of an indium oxide that may be thermally oxidized at temperatures as low as 200° F., that have light transmissions of 75 percent or more, and that have electrical resistances of 1000 ohms per square or less, the preferred thermal evaporation deposition parameters are the following: a deposition rate less than 100-angstroms thickness per minute; a substantial vacuum with less than 10 microns of mercury total residual air pressure or with an oxygen pressure from 0.1 to 4.0 microns of mercury; and a substrate temperature less than about 200° F.

In the practice of this invention in order to obtain coatings with better optical and electrical properties, the ranges of values of the various parameters for thermal evaporation deposition are generally decreased. To obtain coatings as thin as about 1000-angstroms thickness, having a resistance of 200 ohms per square or less, a light transmission of 75 percent or greater, and electrical resistance stabilities such that resistance does not vary more than 50 percent under various environmental conditions, with the film thermally oxidized at temperatures as low as 200° F., the preferred values of the deposition parameters are the following: a deposition rate 50-angstroms thickness per minute or less; a substantial vacuum with residual pressure of oxygen from 0.1 to 4.0 microns of mercury; and a substrate temperature less than about 200° F.

In the deposition of the coatings, substantially of indium, either a small residual air or oxygen pressure should be present to permit subsequent thermal oxidation conversion at temperatures as low as about 200° F. Where a residual pressure of air or about one-sixth the same residual pressure of oxygen are present, the coatings convert with approximately the same ease of conversion to coatings having comparable minimum electrical resistance. However, usually coatings deposited in low residual oxygen pressures after conversion have a more stable electrical resistance than coatings deposited in air at about 6 times the residual pressure of the oxygen. The high resistance coatings generally show more instability in the electrical resistance than low resistance coatings.

In the prior art the thermal oxidation of coatings, substantially of indium, required temperatures in the order of 1000° F. or higher and at lower temperatures no significant amount of conversion to a suitable oxide coating was reported, whether the pressures utilized were atmospheric or reduced pressures.

Contrary to prior art, it has been discovered that conversion of a deposited coating, substantially of indium, to a coating, substantially of an indium oxide, may be accomplished at temperatures as low as about 200° F. Ease of thermal oxidation conversion of the deposited indium coating has been found to be dependent on the deposition conditions.

In the practice of the invention low-pressure thermal oxidation may be used to convert coatings, substantially of indium, deposited at the controlled deposition conditions to coatings, substantially of an idium oxide, having an electrical resistance less than 1000 ohms per square and a light transmittance greater than 70 percent. During thermal oxidation conversion the substrates and coatings, substantially of indium, may be held to a temperature as low as about 200° F. The coatings, substantially of indium, may be maintained at a temperature as low as about 200° F. by performing the conversion in an apparatus surrounded by a heat source, such as a heated oven or by a load heating method. The terms "load heated" or "load heating" as used in the specification and claims are to be understood as the resistance heating of a coating from passing an electrical current through the coating.

Suitable apparatus known to the art may be used for the thermal oxidation conversion method of the invention. In some instances the conversion, if the apparatus permits, may be carried forth within the vacuum apparatus utilized for deposition of the coating, substantially of indium. The conversion apparatus should permit the surrounding of the apparatus by a heat source, such as an oven, for the low-pressure oven heating method of conversion, or the apparatus should provide electrical connections from the coating to an electrical power source for the low-pressure load heating method of conversion.

During a prolonged conversion by thermal oxidation, a coating, substantially of indium, decreases for the initial portion of the oxidation to a minimum electrical resistance and then the electrical resistance remains relatively constant for a portion of the oxidation, whereupon the electrical resistance commences to increase and increases upon prolonged oxidation. Coatings, having low minimum resistances, generally have smaller increases in resistance upon prolonged oxidation than coatings having higher minimum resistances. The light transmittance of the coating during a prolonged conversion by thermal oxidation increases upon an increase in duration of the conversion.

To obtain the coatings and the articles coated therewith of the invention, the duration or requisite length of time for the oxidation conversion to proceed may be determined from measurements of the light transmittance and the electrical resistance during conversion. The oxidation conversion should be discontinued at a point after the desired electrical resistance and the desired light transmittance have been obtained. In coatings having a high minimum electrical resistance this point is usually before a substantial increase in electrical resistance. Cessation of the oxidation-conversion when the minimum resistance is first reached may result in coatings, substantially of an indium oxide, having low light transmittances, unsuitable for the purposes of the invention. Coatings of the invention having a low minimum resistance are more stable and generally have little or no change in electrical resistance when compared to coatings having a higher minimum resistance.

The thin, light transmissive, electrically conductive coatings of the invention are referred to in the specification and the claims as coatings, substantially of an indium oxide, for by the methods of the invention the deposited indium coatings are not subjected to a prolonged oxidation conversion and may not be completely converted upon cessation of the oxidation-conversion. Included within the coatings of the invention, referred to in the specification and the claims as coatings, substantially of an indium oxide, are coatings having a major proportion substantially of an indium oxide and a minor proportion of impurities, other metals, and/or other oxides. For example a minor proportion of a tin oxide may be included in the coating of the invention.

Metal coatings, substantially of indium, deposited by the limited deposition conditions of the invention, may be converted to coatings, substantially of an indium oxide, by an oven heating method or a load heating method at temperatures as low as about 200° F., provided an oxidizing medium such as air or oxygen is present. Conversion may be performed at slightly elevated pressures, or at atmospheric pressure, or at reduced pressures. For the load heating conversion method the deposited coating should be substantially uniform in thickness, for nonuniformity causes hot spots during load heating with nonuniformity in the coating, substantially of an indium oxide, and may cause failure of the junctions between the coating and the power source for load heating.

Generally, indium metal coatings, deposited by the methods of the invention and having electrical resistances of at least 5000 ohms per square, after conversion, give coatings, substantially of an indium oxide, having an electrical resistance at least 1 to 2 orders or more of magnitude lower than the deposited metal coating.

Coatings substantially of an indium oxide, generally decrease in electrical resistance upon exposure to light. The effect does not appear to be merely the well-known photo effect, in which charge carriers are excited by absorption of light. This photoconductive effect may be the result of sorption and desorption of atmospheric gases and the effect may be greatly decreased or eliminated by the use of a protective coating. However, coatings having a low minimum resistance usually show little or no photoconductive effect.

The coatings substantially of an indium oxide, prepared by the method of this invention have a satisfactory stability for their electrical resistance. Generally, coatings, substantially of an indium oxide, undergo electrical resistance increases when exposed to air, and these electrical resistances also change with illumination. However, coatings having a low minimum resistance usually show little or no increase. It was found in testing coatings that the lowest electrical resistance, as is obtained in thermal oxidation, may also be obtained after oxidation in air by prolonged illumination for about 24 hours. This lowest value of the electrical resistance for any coating is referred to as the minimum electrical resistance in the specification and the claims.

Examples, illustrative of the articles and method of the invention, are tabulated in the table that follows and are to be construed as merely illustrative and not as limiting the scope of the present invention. In the table that follows the tabulated light transmittances and the electrical resistances are the light transmittances and the electrical resistances of the coatings, substantially of an indium oxide, as measured upon completion of the oxidation conversion. In all of the following examples of the invention the substrate temperature during deposition was less than 200° F.

| Example No. | Electrical Resistance, (ohms per square) | Transmittance of White Light, (percent) |
|---|---|---|
| 1 | 420 | 70 |
| 2 | 465 | 70 |
| 3 | 550 | 71 |
| 4 | 650 | 80 |
| 5 | 220 | 72 |
| 6 | 225 | 75 |
| 7 | 148 | 73 |
| 8 | 230 | 76 |
| 9 | 118 | 72 |
| 10 | 175 | 72 |
| 11 | 130 | 80 |
| 12 | 250 | 78 |
| 13 | 105 | 81 |
| 14 | 97 | 82 |
| 15 | 82 | 79 |
| 16 | 66 | 74–78 |
| 17 | 77 | 80 |
| 18 | 61 | 79–81 |
| 19 | 68 | 78–81 |
| 20 | 50 | 75–78 |
| 21 | 51 | 77 |
| 22 | 64 | 80 |
| 23 | 98 | 85 |
| 24 | 49 | 75 |
| 25 | 38 | 80 |
| 26 | 46 | 77 |
| 27 | 516 | 72 |
| 28 | 257 | 75 |
| 29 | 118 | 77–79 |
| 30 | 82 | 82.5 |
| 31 | 66 | 85 |
| 32 | 390 | 73 |

*Examples 1 to 4*

The coatings of Examples 1 to 4 were deposited on glass substrates by thermal evaporation at oxygen residual pressures of 0.5 to 0.75 micron of mercury with deposition times ranging from 40 to 53 minutes. The deposition rate for Examples 1 to 4 was less than 100 angstroms thickness per minute and for Examples 2 and 3 was less than 50 angstroms thickness per minute. The deposited indium coatings had electrical resistances for Examples 1, 3, and 4 of approximately 5000 ohms per square and for Example 2 of approximately 2500 ohms per square. The deposited coatings were converted to coatings, substantially of an indium oxide, in air at atmospheric pressure at a temperature of 250° F. in a heated oven for 1 or 2 days. Examples 2 and 3 upon exposure to darkness for one day had measured electrical resistances that had increased 44 and 16 percent, respectively, over the electrical resistances after conversion. Example 2 upon additional exposure to darkness for five days had a measured electrical resistance that had increased 190 percent over the electrical resistance after conversion.

*Examples 5 to 9*

The coatings of Examples 5 to 9 were deposited on glass substrates by thermal evaporation at an oxygen residual pressure of 0.5 micron of mercury with deposition times ranging from 55 to 154 minutes. The deposition rate for Examples 5 and 6 was less than 50 angstroms thickness per minute and for Examples 7, 8, and 9 was less than 100 angstroms thickness per minute. The deposited indium coatings of Examples 5 to 9 had electrical resistances of approximately 5000 ohms per square. The deposited coatings were converted to coatings, substantially of an indium oxide, in air at atmospheric pressure at a temperature of 300° F. in a heated oven with Examples 5 and 6 converted for 1 day. Examples 5 and 6 upon exposure to darkness for one day had measured electrical resistances that had increased 16 and 15 percent, respectively, over the electrical resistance after conversion. Examples 5 and 6 upon additional exposure to darkness for five days had measured electrical resistances that had increased 35 and 41 percent, respectively, over the electrical resistances after conversion. Examples 7 and 8 were stored in darkness for several days and, when the electrical resistances were measured in darkness, the resistances obtained were 35 and 36 percent, respectively, larger than the electrical resistances after conversion. When Examples 7 and 8 were then exposed to light and resistances measured, resistances 12 and 13 percent, respectively, lower than the resistances after conversion were obtained.

Examples 10 to 12

The coatings of Examples 10 to 12 were deposited on glass substrates by thermal evaporation at an oxygen residual pressure of 0.5 micron of mercury with deposition times of 126 or 147 minutes at a deposition rate less than 50-angstroms thickness per minute to obtain deposited indium coatings having electrical resistances of approximately 5000 ohms per square. The deposited coatings were converted to coatings, substantially of an indium oxide, in air at atmospheric pressure at a temperature of 400° F. in a heated oven. Examples 11 and 12 were stored in darkness for several days and then exposed to light and a second resistivity measured. The second resistivities for Examples 11 and 12 were 28 percent higher and 1 percent lower, respectively, than the electrical resistances after conversion. Examples 10 and 11 were exposed to high and low temperatures and the irreversible change in the resistivity was measured. When Example 10 was cooled to −80° F. and later to −110° F. from approximately room temperature and additional resistivity measurements made upon Example 10, after Example 10 had returned to room temperature, apparent irreversible resistance 3 and 11 percent larger than the resistances after conversion were found. Similarly, Example 12 was cooled to −80° F. and an apparent irreversible resistance 1 percent larger than the resistance after conversion was found.

Examples 13 to 16

The coatings of Examples 13 to 16 were deposited on glass substrates by thermal evaporation of indium and tin. The tin content of the deposited coating was controlled by suitable selection of the evaporation temperatures and surface areas of the sources. Examples 13 to 16 were made with the evaporation source temperatures and surface areas adjusted to give a tin content of approximately 10 percent. Spectrographic analysis of Example 13 showed the tin content after deposition to be 10.2±.5 percent by weight. Examples 13 to 15 were deposited at an oxygen residual pressure of 0.5 micron of mercury with deposition times of 100 or 103 minutes at a deposition rate less than 50 angstroms thickness per minute to obtain deposited coatings having electrical resistances of approximately 5000 ohms per square. The deposited coatings of Examples 13 to 16 were converted to coatings, comprising a major proportion of an indium oxide and a minor proportion of a tin oxide, in air at atmospheric pressure at a temperature of 300° F. in a heated oven. Examples 14, 15, and 16 were placed in darkness for about one week and at that time their electrical resistances were 19, 4, and 12 percent, respectively, larger than the resistances after conversion. Upon removal from the darkness to light and measurement of resistances, Examples 14, 15, and 16 had resistances 11 percent larger than, 5 percent smaller than, and the same as, respectively, the resistances after conversion. Example 14 was submitted to continuous electrical load of 500 watts per square foot. At the end of 26 hours the electrical resistance had increased 1 percent from the resistance after conversion and, when the load was discontinued after 66 hours, the electrical resistance was 2.5 percent lower than the resistance after conversion. Example 13 showed by electron and X-ray diffraction methods that the indium in the coating was present substantially as $In_2O_3$, indium sesquioxide, on the surface and in the bulk of the coating and the X-ray diffraction lines from their breadth indicated a solid solution phase.

Examples 17 to 20

Examples 17 to 20 were deposited on glass substrates by thermal evaporation of indium and tin with evaporation source temperatures and surface areas selected to give a coating, having a tin content of approximately 10 percent. Examples 17, 19, and 20 were deposited at an oxygen residual pressure of 0.5 micron of mercury with deposition times ranging from 81 to 103 minutes at a deposition rate less than 50 angstroms thickness per minute to obtain deposited coatings having electrical resistances of approximately 5000 ohms per square. The deposited coatings were converted to coatings, comprising a major proportion of an indium oxide and a minor proportion of a tin oxide, in air at atmospheric pressure at an elevated temperature in a heated oven. Example 17 was converted with a 400° F. oxidation temperature continuously, while Examples 18 to 20 were converted for a short while at 300° F. before raising the temperature to 400° F. for the balance of the oxidation. Examples 17, 18, 19, and 20 were placed in darkness for about one week and at that time their electrical resistances were 4 percent higher than, 5 percent higher than, 12 percent higher than, and the same as, respectively, the resistances after conversion. Upon removal from the darkness to light and measurement of resistances, Examples 17, 18, 19, and 20 had resistances 4, 10, 9, and 4 percent lower, respectively, than the resistances after conversion.

Examples 21 to 26

Examples 21 to 26 were deposited on glass substrates by thermal evaporation of indium and tin with evaporation source temperatures and surface areas selected to give coatings having for Examples 21 to 24 a tin content of approximately 10 percent and for Examples 25 and 26 a tin content of approximately 18 percent. Examples 21 to 26 were deposited at an oxygen residual pressure of 1.0 micron of mercury at a deposition rate less than 50 angstroms thickness per minute. Examples 25 and 26 were deposited for 100 and 165 minutes, respectively. The electrical resistances for the deposited coatings were for Examples 21 to 25 approximately 5000 ohms per square and for Example 26 approximately 6000 ohms per square. The deposited coatings were converted to coatings, comprising a major proportion of an indium oxide and a minor proportion of a tin oxide, in air at atmospheric pressure at a temperature about 400° F. in a heated oven with conversion times ranging from 3½ to 50 hours.

Example 27

Example 27 was a double layer coating, substantially of an indium oxide, on a glass substrate. An initial coating, substantially of indium, was deposited by thermal evaporation at the conditions of the invention and subsequently converted to a coating, substantially of an indium oxide, using conditions of the invention with an oxidation temperature of 250° F. A second coating, substantially of indium, was deposited by thermal evaporation at the conditions of the invention on top of the initial coating and subsequently converted to a coating, substantially of an indium oxide, using conditions of the invention with an oxidation temperature of 250° F. The initial coating, substantially of an indium oxide, had an electrical resistance of 830 ohms per square and a light transmittance of 80 percent. After the second coating was deposited and oxidized the double layer coating, substantially of an indium oxide, had an electrical resistance of 516 ohms per square and a light transmittance of 72 percent. A monitor glass plate was processed along with this example on the second deposition and oxidation, and the single coating, substantially of an indium oxide, on this monitor glass substrate had an electrical resistance of 550 ohms per square and a light transmittance of 80 percent.

*Example 28*

Example 28 was double layer coating, substantially of an indium oxide, on a glass substrate and this example was prepared by a procedure identical with Example 27. The initially deposited coating, substantially of an indium oxide had an electrical resistance of 470 ohms per square and a light transmittance of 80 percent. After the second coating was deposited and oxidized the double-layer coating, substantially of an indium oxide, had an electrical resistance of 257 ohms per square and a light transmittance of 75 percent. A monitor glass plate was processed along with this example on the second deposition and oxidation, and the single coating, substantially of an indium oxide, on this monitor glass substrate had an electrical resistance of 464 ohms per square and a light transmittance of 80 percent.

*Examples 29 to 31*

Example 29 is Example 9 with a magnesium fluoride antireflection coating. Similarly, Example 30 is Example 15 with a magnesium fluoride coating, and Example 31 is Example 16 with a magnesium fluoride coating. The magnesium fluoride coatings were deposited on these examples by thermal evaporation at a pressure of 0.01 to 0.02 micron of mercury with deposition times of 1 to 2 minutes. Examples 29 and 30 had magnesium fluoride coatings estimated to be approximately 1000 A. thick from the interference phenomena of the color of the combination coating, substantially of an indium oxide, overcoated with magnesium fluoride. Example 31 was coated with magnesium fluoride until the color of the combination coating, substantially of an indium oxide, overcoated with magnesium fluoride was purple in reflected white light. The combination coatings, substantially of an indium oxide, overcoated with magnesium fluoride gave increases in light transmittance for Example 29 of approximately 6 percent, for Example 30 of approximately 3.5 percent, and for Example 31 of approximately 9 percent when compared to the light transmittance of the same coating, substantially of an indium oxide, prior to application of the magnesium fluoride coating.

*Example 32*

Example 32 was prepared on a plastic substrate by thermal evaporation of indium and tin with evaporation source temperatures and surface areas selected to give a coating, having a tin content of approximately 10 percent. The plastic substrate was an acrylic plastic sheet sold under the trade name Plexiglas, Type UVA–II, by the Rohm & Haas Company of Philadelphia, Pennsylvania. The coating was deposited at an oxygen residual pressure of 0.5 micron of mercury at a deposition rate less than 100 angstroms thickness per minute to obtain a deposited coating having an electrical resistance of approximately 2500 ohms per square. The plastic substrate temperature during deposition did not exceed about 140° F. The deposited coating was converted to a coating comprising a major proportion of an indium oxide and a minor proportion of a tin oxide in air at atmospheric pressure at a temperature of 220° F. in a heated oven for 9 days.

In the deposition of coatings, substantially of indium, for subsequent conversion to coatings, substantially of an indium oxide, by the process of this invention it has been found that control of the deposition rate is necessary. For example, in thermal evaporation deposition the deposition rate was determined to be approximately inversely proportional to the evaporation time with the longer evaporation times or lower deposition rates resulting in coatings which were more easily oxidized and capable of oxidation at the low temperatures of this invention. Not only should there be a low over-all deposition rate, but also preferably the initial deposition rate, during the first minute or less of the evaporation and deposition, should not be greater than about 100-angstroms thickness per minute. Where both the initial deposition rate and the over-all deposition rate are greater than about 100-angstroms thickness per minute, the coatings after oxidation have unsuitable electrical conductivity in that high electrical resistances are obtained. Where only the initial deposition rate is greater than about 100-angstroms thickness per minute, but the over-all deposition rate is 100-angstroms thickness per mintue or less; after oxidation the coatings have somewhat lower electrical conductivity than where both the initial and over-all deposition rate are maintained at 100 angstroms per minute or less.

In the practice of the invention the substrate may be controlled so as to not exceed 200° F. during the deposition of the coating, substantially of indium. During the thermal oxidation conversion of the deposited indium coating to a coating, substantially of an indium oxide, the use of a high temperature for the substrate and deposited coating is not necessary, with temperatures as low as about 200° F. being permissible and with temperatures as low as 250° F. being consistent with a reasonable time for oxidation. Indium coatings may be oxidized to coatings, substantially of an indium oxide, at temperatures less than about 250° F. by prolonged oxidation times. However, if the substrate permits oxidation temperatures higher than about 250° F., the oxidation time may be shortened appreciably with periods as short as 15 minutes being sufficient at 400° F. to convert the deposited coating to a coating, substantially of an indium oxide. Knowing the temperatures at which a substrate is adversely affected, a suitable selection of a temperature for thermal oxidation conversion of the deposited coating may be made. For example, commercial laminated safety glass may be heated to about 250° F. at atmospheric pressure and to about 350° F. at a higher pressure before detrimental effects, such as a bubbling of the plastic laminate occur. Accordingly, the thermal oxidation conversion of a deposited coating on laminated safety glass should be carried out at a temperature for the substrate less than the temperature causing detrimental effects in the laminated safety glass.

Generally, coatings, substantially of an indium oxide, prepared by the methods of this invention are from a clear to a pale straw-yellow in color, have optical transmission of white light in excess of 70 percent, a haze less than 2 percent, and a light reflectivity of approximately 10 to 20 percent. Haze value of the coatings was measured with an apparatus conforming to Federal Specification LP–406B, Test Method 3021.

In the practice of this invention coatings with light transmissions greater than 70 to 85 percent may be obtained. Since most of the loss in light transmission is due to surface reflectivity and not to absorption of light by the coating, the light transmission can be substantially increased by overcoating with a low reflection coating. The amount of decrease of surface reflectivity and the corresponding increase in light transmission depends primarily on the respective indices of refraction and the thickness of the low reflection coating. Magnesium fluoride is a suitable low reflection coating, and other coatings are well known to those skilled in the art. The magnesium fluoride coating was applied over the coating, substantially of an indium oxide, by thermal evaporation. The deposition time of the magnesium fluoride coating was approximately 1 to 2 minutes, the pressure in the evacuated system during deposition was about 0.01 to 0.02 micron of mercury, and the substrate and coating being overcoated did not exceed 150° F. Thickness of the magnesium fluoride coating was estimated from the reflected color of a monitor substrate coated at the same time. When the color of the combination indium oxide coating with a magnesium fluoride overcoating was purple in reflected white light, the coating generally gave the greatest increase in light transmission. Increases in light transmission of coatings substantially of indium oxide by overcoating with magnesium fluoride from 1 to 10 percent have been obtained with an average increase of about 8 percent. Since the light absorption of indium oxide coatings is lower than for most known electrically conductive coatings, the maximum light transmission obtained in combination with a low reflection overcoating will be higher than that obtained using the same low reflection overcoating on coatings of the same light transmittance having greater light absorption.

It is understood that the invention includes coatings, substantially of an indium oxide, where two or more metals are deposited on the substrate. Where a metal or metal is deposited along with substantially indium on the substrate and subsequently converted to the oxide by the method of this invention, it is to be understood that these coatings fall within the true spirit and scope of the invention. For example, tin and indium have been deposited and then oxidized by the method of this invention to give an article having a coating comprising a major proportion substantially of an indium oxide and a minor proportion of a tin oxide. Preferably both indium and tin are deposited simultaneously on the substrate. Source temperatures and surface areas may be selected to give coatings containing the desired tin-indium ratio.

As is well known by those skilled in the art, impurity additions may have a deleterious or an upgrading effect on the properties of the coating. Where changes in the properties of the coating are desired, and impurity additions are made, so that the coating is composed substantially of indium oxide with a minor proportion of impurities, it is to be understood that these coatings fall within the true spirit and scope of the invention.

As is well known by those skilled in the art, adhesion to the substrate may be improved, or the light transmission varied, or the electrical resistivity of the coating on the substrate may be varied by the deposition on the substrate of an initial coating of suitable properties prior to the formation of a light transmissive, electrically conductive coating on top of this initial coating on the substrate. This initial coating between the substrate and the coating of this invention may be an initial coating, substantially of an indium oxide, deposited and oxidized by the method of this invention, and an embodiment of an article of the invention may comprise a substrate with a multilayer coating of this invention.

The forms of the invention described herein constitute preferred embodiments of the invention and it is to be understood that the invention is not limited to these precise forms, but may be embodied in other specific forms without departing from the spirit or essential attributes thereof with reference being made to the appended claims rather than to the foregoing description to indicate the scope of the invention.

What is claimed is:

1. In a method for preparation of a thin coating, substantially of an indium oxide, the step which comprises depositing indium by thermal evaporation on a substrate at a rate of less than 100-angstroms thickness per minute in a residual air pressure of from 0.1 to 50 microns of mercury with said substrate temperature less than 200° F.

2. In a method for preparation of a thin coating, substantially of an indium oxide, said coating having an electrical resistance less than 1000 ohms per square and a light transmittance greater than 70 percent, the step which comprises depositing by thermal evaporation a coating, substantially of indium, on a substrate at a rate of less than 100-angstroms thickness per minute in a substantial vacuum having a residual oxygen pressure from 0.1 to 4.0 microns of mercury with said substrate temperature less than 200° F.

3. In a method for preparation of a thin coating, substantially of an indium oxide, said coating having an electrical resistance less than 200 ohms per square and a light transmittance greater than 75 percent, the step which comprises depositing by thermal evaporation indium and tin on a substrate at a rate of less than 50-angstroms thickness per minute in a residual oxygen pressure from 0.1 to 4.0 microns of mercury with said substrate temperature less than 200° F.

4. A method for preparation of a thin, transparent, electrically conductive coating, substantially of an indium oxide, said coating having a light transmittance greater than 70 percent and an electrical resistance less than 1000 ohms per square, which comprises: depositing by thermal evaporation at a low pressure an indium coating at a deposition rate less than 100-angstroms thickness per minute on a substrate, having a temperature less than 200° F.; and converting said indium coating by thermal oxidation to a coating, substantially of an indium oxide, at a temperature as low as about 200° F.

5. An article produced by the process of claim 4.

6. A method for preparation of a thin, transparent, electrically conductive coating, substantially of an indium oxide, said coating having a light transmittance greater than 70 percent and an electrical resistance less than 1000 ohms per square, which comprises: depositing by thermal evaporation a coating, substantially of indium, in a residual air pressure of from 0.1 to 50 microns of mercury at a deposition rate less than 100-angstroms thickness per minute on a substrate having a temperature less than 200° F.; and converting said indium coating by thermal oxidation to a coating, substantially of an indium oxide, at a temperature as low as about 200° F.

7. A method for preparation of a thin, transparent, electrically conductive coating, substantially of an indium oxide, said coating having a light transmittance greater than 75 percent and an electrical resistance less than 200 ohms per square, which comprises: depositing an indium coating from thermal evaporation of an indium source at an oxygen pressure from 0.1 to 4.0 microns of mercury and at a deposition rate less than 50-angstroms thickness per minute on a substrate, having a temperature less than 200° F.; and converting said indium coating by thermal oxidation to a coating, substantially of an indium oxide, at a temperature as low as about 200° F. in an oxidizing medium selected from the group consisting of air and oxygen.

8. A method for preparation of a thin, transparent, electrically conductive coating, comprising a major proportion of an indium oxide and a minor proportion of a tin oxide, said coating having a light transmittance greater than 75 percent and an electrical resistance less than 200 ohms per square, which comprises: depositing a coating of indium and tin from thermal evaporation of an indium source and a tin source in an oxygen pressure from 0.1 to 4.0 microns of mercury and at a deposition rate less than 50-angstroms thickness per minute on a substrate, having a temperature less than 200° F.; and converting said coating of indium and tin by oxidation to a coating, comprising a major proportion of an indium oxide and a minor proportion of a tin oxide, at a temperature as low as about 200° F. in an oxidizing medium selected from the group consisting of air and oxygen.

9. A method as in claim 8 including the discontinuing of said converting after the minimum electrical resistance of said electrically conductive coating has been obtained.

References Cited in the file of this patent

UNITED STATES PATENTS

| | | |
|---|---|---|
| Re. 23,556 | Mochel | Sept. 30, 1952 |
| 2,578,956 | Weinrich | Dec. 18, 1951 |
| 2,628,927 | Colbert et al. | Feb. 17, 1953 |
| 2,694,649 | Tarnopol | Nov. 16, 1954 |

OTHER REFERENCES

Strong: J. Procedures in Experimental Physics, Prentice-Hall, New York, 1947, pages 151–187.

Nelson: J. H. Metal Ind. (London), 73, 343–345, 369–371, 373 (1948).

Dedication 2,932,590.—*Robert E. Barrett*, *Earl R. Olson* and *Paul Schall, Jr.*, Columbus, Ohio. INDIUM OXIDE COATINGS. Patent dated Apr. 12, 1960, Dedication filed Aug. 2, 1974, by the assignee, *The Battelle Development Corporation*.

Hereby dedicates to the People of the United States the entire remaining term of said patent.

[*Official Gazette March 11, 1975.*]